United States Patent
Baker et al.

(10) Patent No.: US 12,447,453 B2
(45) Date of Patent: Oct. 21, 2025

(54) ROTATABLE RETAINING DEVICE FOR TUBULAR REACTORS

(71) Applicant: JOHNSON MATTHEY DAVY TECHNOLOGIES LIMITED, London (GB)

(72) Inventors: Robert Miles Baker, London (GB); Henry Arthur Claxton, London (GB); Simon Graham, London (GB); Dean Graham Shaw, London (GB)

(73) Assignee: Johnson Matthey Davy Technologies Limited, London (GB)

( * ) Notice: Subject to any disclaimer, the term of this patent is extended or adjusted under 35 U.S.C. 154(b) by 192 days.

(21) Appl. No.: 18/040,100

(22) PCT Filed: Sep. 24, 2021

(86) PCT No.: PCT/GB2021/052490
§ 371 (c)(1),
(2) Date: Jan. 31, 2023

(87) PCT Pub. No.: WO2022/064211
PCT Pub. Date: Mar. 31, 2022

(65) Prior Publication Data
US 2023/0285917 A1    Sep. 14, 2023

(30) Foreign Application Priority Data
Sep. 25, 2020 (GB) .................................. 2015189

(51) Int. Cl.
*B01J 4/00* (2006.01)
*B01J 8/00* (2006.01)
*B01J 8/06* (2006.01)

(52) U.S. Cl.
CPC .......... *B01J 8/0045* (2013.01); *B01J 8/0035* (2013.01); *B01J 8/06* (2013.01);
(Continued)

(58) Field of Classification Search
CPC . B01J 8/0045; B01J 8/0035; B01J 8/06; B01J 2208/00769; B01J 2208/00884;
(Continued)

(56) References Cited

U.S. PATENT DOCUMENTS

| | | | | |
|---|---|---|---|---|
| 1,126,194 A | * | 1/1915 | Graham | ................. B65H 3/325 221/297 |
| 2,310,907 A | * | 2/1943 | McMillan | ................ B01J 8/067 422/219 |

(Continued)

FOREIGN PATENT DOCUMENTS

| | | |
|---|---|---|
| CL | 2023000711 A1 | 10/2023 |
| CL | 2023000744 A1 | 10/2023 |

(Continued)

*Primary Examiner* — Lynn E Schwenning
(74) *Attorney, Agent, or Firm* — BakerHostetler

(57) ABSTRACT

A reactor tube for a tubular reactor and a retaining device associated with the reactor tube; the reactor tube comprising an elongate tube defining a bore for receiving in use a catalyst and having an outlet at one end of the bore for discharging the catalyst out of the bore; the retaining device being configured to be rotatable between a first position and a second position; wherein in the first position the retaining device at least partially obstructs the outlet for retaining the catalyst within the bore; and in the second position the outlet is unobstructed sufficiently for permitting discharge of the catalyst out of the outlet.

18 Claims, 9 Drawing Sheets

(52) U.S. Cl.
CPC .......... *B01J 2208/00769* (2013.01); *B01J 2208/00884* (2013.01); *B01J 2208/06* (2013.01)

(58) Field of Classification Search
CPC .......... B01J 2208/06; B01J 2204/005; B01J 2208/00761; B01J 2208/00814; B01J 8/002; B01J 8/003; B01J 4/007; B01J 8/00
USPC .............................................. 414/797.7, 798
See application file for complete search history.

(56) References Cited

U.S. PATENT DOCUMENTS

| | | | | |
|---|---|---|---|---|
| 2,680,510 | A * | 6/1954 | Donath | H01M 10/14 29/730 |
| 5,015,446 | A * | 5/1991 | Trujillo | B01J 8/008 422/637 |
| 6,189,678 | B1 * | 2/2001 | Loewenthal | B65B 23/14 414/797.9 |
| 6,190,624 | B1 * | 2/2001 | Romatier | B01J 19/249 422/219 |
| 2007/0299148 | A1 | 12/2007 | Verbist | |
| 2014/0348712 | A1 * | 11/2014 | Baranowski | B65G 53/4658 251/309 |
| 2023/0264160 | A1 | 8/2023 | Claxton | |
| 2023/0271151 | A1 | 8/2023 | Clarkson et al. | |
| 2023/0294056 | A1 | 9/2023 | Clarkson et al. | |
| 2023/0294058 | A1 | 9/2023 | Clarkson et al. | |

FOREIGN PATENT DOCUMENTS

| | | |
|---|---|---|
| CL | 2023000749 A1 | 10/2023 |
| CL | 2023000746 A1 | 11/2023 |
| CN | 208010960 U | 10/2018 |
| DE | 268630 A1 | 6/1989 |
| FR | 2166167 A1 | 8/1973 |
| WO | 2011/048361 A1 | 4/2011 |
| WO | 2012/136971 A1 | 10/2012 |
| WO | 2016/050520 A1 | 4/2016 |

* cited by examiner

ROTATABLE RETAINING DEVICE FOR TUBULAR REACTORS

The present disclosure relates to improvements in or relating to tubular reactors. In particular, the present disclosure relates to retaining devices for use with reactor tubes of tubular reactors.

BACKGROUND

Conventional, so-called fixed bed, tubular reactors comprise a reactor shell containing a plurality of reactor tubes, which are usually cylindrical, and which are usually directly filled with catalyst particles. In use, a heat transfer medium flows through the shell of the reactor outside these reactor tubes and thereby adjusts the temperature of the catalyst in the reactor tubes by heat exchange across the tube wall. Thus, where the reaction is an exothermic reaction, the heat transfer medium will allow heat to be removed from the catalyst and where the reaction is an endothermic reaction, the heat transfer medium will provide heat to the catalyst.

For some reactions, the heat effects of the reaction are moderate such that they are either not problematic or they can be readily managed. In some cases, the heat effects are sufficiently small that large-diameter reactor tubes may be used. This has the benefit that there is a large volume of catalyst within the reactor tube.

However, for more exothermic or endothermic reactions it is necessary that there is efficient heat transfer via the tube wall to the heat transfer medium to enable the conditions within the reactor to be controlled in order to maintain a stable operating temperature to avoid detrimental effects occurring. Such effects, for exothermic reactions, may include side reactions taking place, damage to the catalyst such as by sintering of the catalytic active sites, and, in a worst case, thermal runaway. Detrimental effects for endothermic reactions may include quenching of the reaction.

To achieve the desired efficiency, the surface area of the tube wall per unit length has to be maximised. This has in the past been achieved by installing a greater number of smaller diameter reactor tubes. In some reactions, the size restriction means that the reactor tubes are only of the order of about 15 to 40 mm internal diameter. However, the use of this multiplicity of reactor tubes increases the cost and complexity of the reactor.

Thus, in an attempt to mitigate these problems an alternative approach has been developed, in particular for more exothermic or endothermic reactions, in which the catalyst is not directly packed into the reactor tubes but is instead contained in a plurality of catalyst carriers that are configured to sit within the reactor tube.

A first type of such a catalyst carrier is described in WO2011/048361. This arrangement seeks to optimise heat transfer at the tube wall such that larger tubes and larger volumes of smaller catalyst particles can be used, even for more exothermic or endothermic reactions. The catalyst carrier described in WO 2011/048361 comprises an annular container for holding catalyst in use. The container has a perforated inner wall defining a tube, a perforated outer wall, a top surface closing the annular container and a bottom surface closing the annular container. The surface closing the bottom of the tube is formed by the inner wall of the annular container. A skirt extends upwards from the perforated outer wall of the annular container from a position at or near the bottom surface of the container to a position below the location of a seal. A seal is located at or near the top surface and extends from the container by a distance which extends beyond an outer surface of the skirt.

A second type of such a catalyst carrier is described in WO2012/136971. In this arrangement, the catalyst carrier comprises a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and a seal located at or near a top surface of the monolith catalyst and extending from the monolith catalyst by a distance which extends beyond an outer surface of the skirt.

A third type of such a catalyst carrier is described in WO2016/050520. In this arrangement, the catalyst carrier comprises a container for holding catalyst in use. The container has a bottom surface closing the container and a top surface. A carrier outer wall extends from the bottom surface to the top surface and a seal extends from the container by a distance which extends beyond the carrier outer wall. The carrier outer wall has apertures located below the seal.

To prevent loss of containment of particulate catalyst from the reactor tubes, various means have been provided that typically include a mesh or grill that may be held permanently in place by resilient means or frameworks attached to or located below the lower tube sheet. For catalyst carriers, a support grid has been used as a retaining system that is bolted together within the reactor and fixed to the lower tube sheet via studs and bolts.

With both fixed bed tubular reactors and those configured to receive catalyst contained in catalyst carriers there may be a need to empty the reactor tubes of catalyst. This need may arise, for example, because the catalyst has degraded over time and requires replacement.

Degradation may be physical, for example due to processes such as fracturing of the catalyst caused by repeated expansion and contraction of the tubes, or chemical, for example due to poisoning of the catalyst. This need may also arise from a requirement to carry out periodic inspection or maintenance on the tubular reactor.

Emptying the reactor tubes of catalyst can be a labour-intensive, hazardous and time-consuming process. Tubular reactors may comprise a large number of reactor tubes. Each reactor tube may comprise a significant volume of catalyst or a large number of catalyst carriers. Down time of the tubular reactor may result in significant costs in terms of lost production time. In addition, controlled discharge of the particulate catalyst or catalyst carriers may not be possible or easy to achieve using known retention systems.

For all these reasons it would be desirable to provide a way of improving the process of emptying the reactor tubes of catalyst. In particular, it would be desirable to facilitate discharge of catalyst from the reactor on a tube-by-tube basis in a fast and controllable manner.

SUMMARY OF THE DISCLOSURE

In a first aspect of the present disclosure there is provided a reactor tube for a tubular reactor and a retaining device associated with the reactor tube;

the reactor tube in the form of an elongate tube defining a bore for receiving in use a catalyst and having an outlet at one end of the bore for discharging the catalyst out of the bore;

the retaining device being configured to be rotatable between a first position and a second position;
wherein in the first position the retaining device at least partially obstructs the outlet for retaining the catalyst within the bore; and
in the second position the outlet is unobstructed sufficiently for permitting discharge of the catalyst out of the outlet.

Advantageously, the retaining device may provide an improved means for emptying the reactor tube of catalyst.

The retaining device may be rotatable about an axis that is parallel to, and non-coincident with, a longitudinal axis of the elongate tube.

The retaining device may comprise a rotatable body that is rotatable between the first position and the second position.

The rotatable body may comprise at least one obstructing portion and at least one non-obstructing portion arranged at different circumferential regions of the rotatable body;
wherein in the first position the at least one obstructing portion may be configured to at least partially obstruct the outlet and in the second position the at least one non-obstructing portion may be configured to align with the outlet.

The rotatable body may comprise a central pivot about which the rotatable body is configured to rotate.

In some embodiments the rotatable body may comprise a rotatable disc.

The rotatable disc may comprise a disc body and at least one aperture;
wherein in the first position the disc body may be configured to at least partially obstruct the outlet for retaining the catalyst within the bore and in the second position the at least one aperture may be configured to align with the outlet.

The at least one aperture may be an at least one open aperture that extends to a periphery of the disc body to define at least one cut-out segment of the rotatable disc.

In some embodiments the or each cut-out segment of the rotatable disc may be lens-shaped.

In some embodiments the disc body may be lune-shaped.

The rotatable body may comprise one, two, three or four apertures. This may be particularly the case where the retaining device is intended to control discharge of the catalyst from one, two, three or four outlets.

In some embodiments the rotatable body may comprise an arm or lobe or lobe;
wherein in the first position the arm or lobe or lobe may be configured to at least partially obstruct the outlet for retaining the catalyst within the bore and in the second position the arm or lobe or lobe may be configured to be non-aligned with the outlet.

In some embodiments the rotatable body may comprise two, three or four arms or lobes or lobes. This may be particularly the case where the retaining device is intended to control discharge of the catalyst from two, three or four outlets.

In some embodiments the bore may be configured to receive in use the catalyst in the form of a plurality of catalyst carriers that contain the catalyst and are insertable into the bore;
wherein in the first position the retaining device may at least partially obstruct the outlet so as to retain the plurality of catalyst carriers within the bore; and
in the second position the outlet may be unobstructed sufficiently so as to permit discharge of the plurality of catalyst carriers out of the outlet.

In the first position the retaining device may be configured to support an endmost one of the plurality of catalyst carriers.

In the first position the retaining device:
may directly support the endmost one of the plurality of catalyst carriers by contacting the endmost one of the plurality of catalyst carriers; or
may indirectly support the endmost one of the plurality of catalyst carriers by contacting a supporting device that itself supports the endmost one of the plurality of catalyst carriers.

In some other embodiments the bore may be configured to receive in use the catalyst in the form of catalyst particles that are filled loose into the bore;
wherein in the first position the retaining device may at least partially obstruct the outlet so as to retain the catalyst particles within the bore; and
in the second position the outlet may be unobstructed sufficiently so as to permit discharge of the catalyst particles out of the outlet.

The reactor tube and retaining device may further comprise a supporting device that supports the catalyst particles within the bore;
wherein in the first position the retaining device may at least partially obstruct the outlet so as to retain the supporting device and hence the catalyst particles within the bore; and
in the second position the outlet may be unobstructed sufficiently so as to permit discharge of the supporting device and thereafter the catalyst particles out of the outlet.

The supporting device may take any suitable form. For example, the supporting device may comprise a hollow or porous body with at least an upper mesh for supporting the particulate catalyst. Alternatively, the supporting device may comprise an inert support material. The inert supporting material may comprise inert balls, for example alumina balls, which have a larger diameter than the particulate catalyst. The inert balls may be graded in size to avoid loss of catalyst from the reactor tube. Alternatively, the supporting device may comprise one or more coiled springs which expand against the reactor tube wall to retain the particulate catalyst like a basket.

In a second aspect of the present disclosure there is provided a tubular reactor comprising a plurality of reactor tubes and a plurality of retaining devices;
each reactor tube comprising an elongate tube defining a bore for receiving in use a catalyst and having an outlet at one end of the bore for discharging the catalyst out of the bore;
each retaining device being associated with one or more reactor tubes and being configured to be rotatable between a first position and a second position;
wherein in its first position each retaining device at least partially obstructs the outlet of one, some or all of its one or more associated reactor tubes for retaining the catalyst within the bore of one, some or all of its one or more associated reactor tubes; and
in its second position the outlet of at least one of its one or more associated reactor tubes is unobstructed sufficiently for permitting discharge of the catalyst out of said outlet.

In its first position each retaining device may at least partially obstruct the outlet of all of its one or more associated reactor tubes for retaining the catalyst within the bore of all of its one or more associated reactor tubes.

In its second position the outlet of at least two or all of its one or more associated reactor tubes may be unobstructed sufficiently for permitting discharge of the catalyst out of said outlets.

Each reactor tube may have two, three or four retaining devices associated with its outlet.

In some embodiments the plurality of retaining devices may each be rotatable independently of each other.

In some other embodiments two or more of the plurality of retaining devices may be interlinked to be rotatable synchronously.

The two of more retaining devices may be interlinked by a link member, wherein the link member may be actuatable to rotate the two or more retaining devices.

The plurality of reactor tubes may be arranged in an equi-spaced regular pattern with each pair of reactor tubes being separated by a centre-to-centre uniform distance, D;
- the plurality of retaining devices may also arranged in an equi-spaced regular pattern with each pair of retaining devices being separated by the centre-to-centre uniform distance, D; and
- the equi-spaced regular pattern of the retaining devices may be offset from the equi-spaced regular pattern of reactor tubes.

Each retaining device may be aligned at an interstice between two, optionally between three or four reactor tubes.

Each retaining device may be rotatable about an axis that is parallel to, and non-coincident with, the longitudinal axes of the elongate tubes.

Each retaining device may comprise a rotatable body that is rotatable between its first position and its second position.

Each rotatable body may comprise at least one obstructing portion and at least one non-obstructing portion arranged at different circumferential regions of the rotatable body;
- wherein in its first position the at least one obstructing portion may be configured to at least partially obstruct the outlet of one, some or all of its one or more associated reactor tubes and in its second position the at least one non-obstructing portion may be configured to align with the outlet of one, some or all of its one or more associated reactor tubes.

Each rotatable body may comprise a central pivot about which the rotatable body is configured to rotate.

In some embodiments each rotatable body may comprise a rotatable disc.

The rotatable disc may comprise a disc body and at least one aperture;
- wherein in its first position the disc body may be configured to at least partially obstruct the outlet of one, some or all of its one or more associated reactor tubes and in its second position the at least one aperture may be configured to align with the outlet of one, some or all of its one or more associated reactor tubes.

The at least one aperture may be an at least one open aperture that extends to a periphery of the disc body to define at least one cut-out segment of the rotatable disc.

The or each cut-out segment of the rotatable disc may be lens-shaped.

Each disc body may be lune-shaped.

Each rotatable body may comprise one, two, three or four apertures. This may be particularly the case where the retaining device is intended to control discharge of the catalyst from one, two, three or four outlets.

Each rotatable body may comprise an arm or lobe or lobe;
- wherein in the first position the arm or lobe or lobe may be configured to at least partially obstruct the outlet of one, some or all of its one or more associated reactor tubes and in the second position the arm or lobe or lobe may be configured to be non-aligned with the outlet of one, some or all of its one or more associated reactor tubes.

In its first position the arm or lobe or lobe may extend across two or more associated reactor tubes.

The arm or lobe may be straight or curved.

Each rotatable body may comprise two, three or four arms or lobes. This may be particularly the case where the retaining device is intended to control discharge of the catalyst from two, three or four outlets.

The tubular reactor may further comprise a tube sheet supporting the plurality of reactor tubes wherein the plurality of retaining devices may be mounted to the tube sheet.

In some embodiments the plurality of retaining devices may be mounted to stud bolts of the tube sheet.

In some embodiments the tube sheet may be a lower tube sheet.

The tubular reactor may further comprise a plurality of locking elements for selectively preventing rotation of the retaining devices.

Each locking element may comprise a locking body that can be engaged against one or more retaining devices to block rotation of said retaining devices.

In some embodiments each bore may be configured to receive in use the catalyst in the form of a plurality of catalyst carriers that contain the catalyst and are insertable into the bore;
- wherein in its first position each retaining device may at least partially obstruct the outlet of one, some or all of its one or more associated reactor tubes so as to retain the plurality of catalyst carriers within the bore of one, some or all of its one or more associated reactor tubes; and
- in its second position the outlet of at least one of its one or more associated reactor tubes may be unobstructed sufficiently for permitting discharge of the plurality of catalyst carriers out of said outlet.

In its first position each retaining device may be configured to support an endmost one of the plurality of catalyst carriers.

In its first position each retaining device:
- may directly support the endmost one of the plurality of catalyst carriers by contacting the endmost one of the plurality of catalyst carriers; or
- may indirectly support the endmost one of the plurality of catalyst carriers by contacting a supporting device that itself supports the endmost one of the plurality of catalyst carriers.

The supporting device may be pushed or placed first into the reactor tube followed by the plurality of catalyst carriers.

In some other embodiments each bore may be configured to receive in use the catalyst in the form of catalyst particles that are filled into the bore;
- wherein in its first position each retaining device may at least partially obstruct the outlet of one, some or all of its one or more associated reactor tubes so as to retain the catalyst particles within the bore of one, some or all of its one or more associated reactor tubes; and
- in its second position the outlet of at least one of its one or more associated reactor tubes may be unobstructed sufficiently so as to permit discharge of the catalyst particles out of said outlet.

In some embodiments the tubular reactor may further comprise a plurality of supporting devices that support the catalyst particles within the bores;

wherein in its first position each retaining device may at least partially obstruct the outlet of one, some or all of its one or more associated reactor tubes so as to retain a supporting device and hence the catalyst particles within the bore of one, some or all of its one or more associated reactor tubes; and in the second position the outlet of one, some or all of its one or more associated reactor tubes may be unobstructed sufficiently so as to permit discharge of the supporting device and thereafter the catalyst particles out of said outlet or outlets.

In a third aspect of the present disclosure there is provided a method of loading and unloading catalyst into and out of a reactor tube of a tubular rector, the reactor tube comprising an elongate tube defining a bore for receiving a catalyst and having an outlet at one end of the bore for discharging the catalyst out of the bore, the method of loading comprising:

associating with the outlet of the reactor tube a retaining device;
rotating the retaining device into a first position in which it at least partially obstructs the outlet;
loading the catalyst into the reactor tube such that they are retained and supported by the retaining device;
the method of unloading comprising:
rotating the retaining device into a second position in which the outlet is sufficiently unobstructed; and
discharging the catalyst out of the outlet.

Two or more retaining devices may be associated with the outlet of the reactor tube; and the method of loading may comprise:

rotating each of the two or more retaining devices into their first position in which they at least partially obstruct the outlet;
loading the catalyst into the reactor tube such that it is retained and supported by the retaining devices;
the method of unloading may comprise:
rotating each of the two or more retaining devices into their second position in which the outlet is sufficiently unobstructed; and
discharging the catalyst out of the outlet.

The tubular reactor may comprise a plurality of reactor tubes and a plurality of retaining devices; and the method of loading may comprise:

rotating each retaining device into its first position in which it at least partially obstructs the outlet of at least one reactor tube;
loading the catalyst into the reactor tubes such that they are retained and supported by the retaining devices;
the method of unloading may comprise:
rotating one or more of the retaining devices into its second position such that the outlet of at least one of the reactor tubes is sufficiently unobstructed; and
discharging the catalyst out of said outlet or outlets.

In some embodiments the reactor tubes may be unloaded one at a time by selectively rotating the retaining devices to sufficiently unobstruct the outlet of only one reactor tube at a time.

In some other embodiments the reactor tubes may be unloaded two or more at a time by selectively rotating the retaining devices to sufficiently unobstruct the outlets of two or more reactor tubes at the same time.

In some embodiments the catalyst may be loaded into each bore by providing the catalyst in a plurality of catalyst carriers and loading the plurality of catalyst carriers into each bore.

In some other embodiments the catalyst may be loaded into each bore by filling loose catalyst particulate into each bore.

The tubular reactors, reactor tubes and retaining devices disclosed in this specification may be used for a wide range of processes. Examples of suitable processes include reactors for exothermic reactions such as reactions for the production of methanol, reactions for the production of ammonia, methanation reactions, water-gas shift reactions, oxidation reactions such as the formation of formaldehyde, maleic anhydride and ethylene oxide, Fischer-Tropsch reactions, and the like. Endothermic reactions such as pre-reforming, steam reforming, dehydrogenation and the like may also be carried out in reactors including the catalyst carriers of the present disclosure.

The tubular reactors, reactor tubes and retaining devices of the present disclosure may advantageously allow catalyst to be used in medium to highly exothermic or endothermic reactions.

The catalyst of the present disclosure may be provided, for example, as loose catalyst particles or as a catalyst monolith or catalyst particles or monoliths contained within a catalyst carrier. The catalyst may be provided as a single bed of catalyst or multiple beds of catalyst. The catalyst carrier may be configured to promote axial and or radial flow through the catalyst. In some embodiments the catalyst carrier may be configured to preferentially promote radial flow through the catalyst.

BRIEF DESCRIPTION OF THE DRAWINGS

Embodiments of the present disclosure will now be described, by way of example only, with reference to the accompanying drawings, in which.

DETAILED DESCRIPTION

Figure 1:
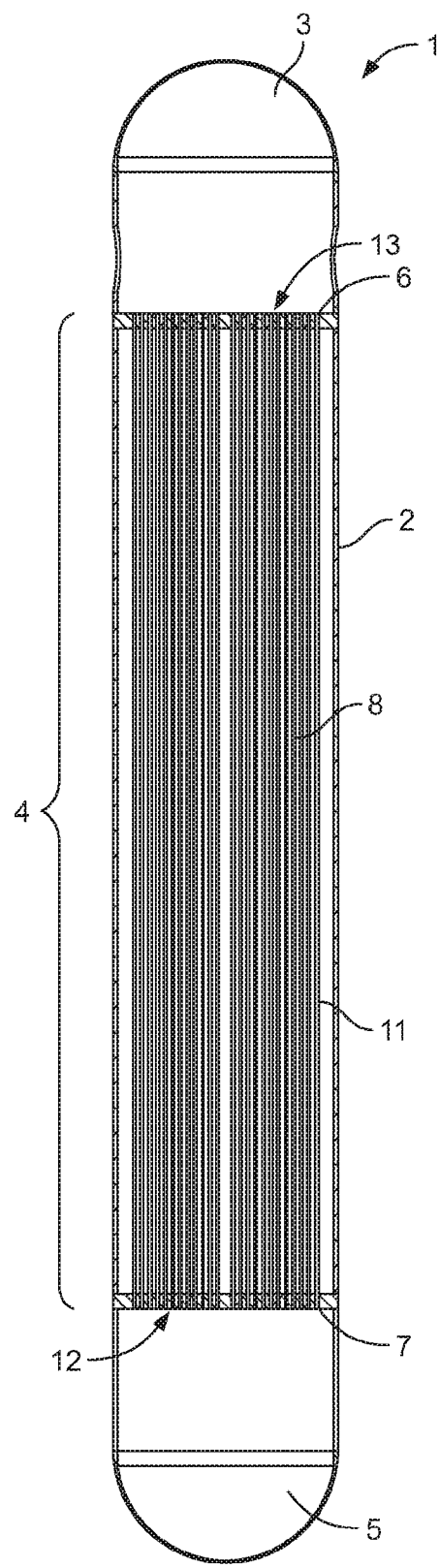
FIG. 1 is a schematic view of a tubular reactor.

In the following, aspects and embodiments of the present disclosure will be described, by way of example only, with reference to a vertically-orientated tubular reactor having a plurality of vertical reactor tubes extending between an upper tube sheet and a lower tube sheet. However, it will be understood that the present disclosure may also be applied to other configurations of tubular reactor that may adopt other orientations.

Additionally, in this specification any reference to orientation, for example terms such as top, bottom, upper, lower, above, below and the like have, is used with regard to the orientation of the parts as illustrated in the drawings being referenced but is not to be seen as restrictive on the potential orientation of such parts in actual use. For example, a part described as being orientated vertically may also be orientated horizontally.

FIG. 1 shows a typical layout of a tubular reactor 1 of the present disclosure. The tubular reactor 1 comprises a housing 2. The interior of the housing may be divided into a head space 3, a heat exchange zone 4 and a footer space 5 by two tube sheets—an upper tube sheet 6 and a lower tube sheet 7. The upper tube sheet 6 separates the head space 3 from the heat exchange zone 4. The lower tube sheet 7 separate the footer space 5 from the heat exchange zone 4.

A plurality of reactor tubes 8 extend between the upper tube sheet 6 and the lower tube sheet 7. Each reactor tube 8 comprises an elongate tube defining a bore 11 and has an outlet 12 at one end of the bore 11. The outlet 12 may be at the lower end of the reactor tube 8. An inlet 13 of the reactor tube 8 may be provided at an opposed end of the reactor tube 8, for example at an upper end.

A large number of reactor tubes 8 may be provided, for example between 20 and 80,000 reactor tubes 8 may be present. The bore 11 of each reactor tube 8 may have, for example, an internal diameter of between 20 and 150 mm. In some embodiments the internal diameter may be about 85 mm.

Each reactor tube 8 is intended to receive in use a catalyst 9 within its bore 11. The catalyst 9 may be loose or may be packaged in various forms.

Figure 2:
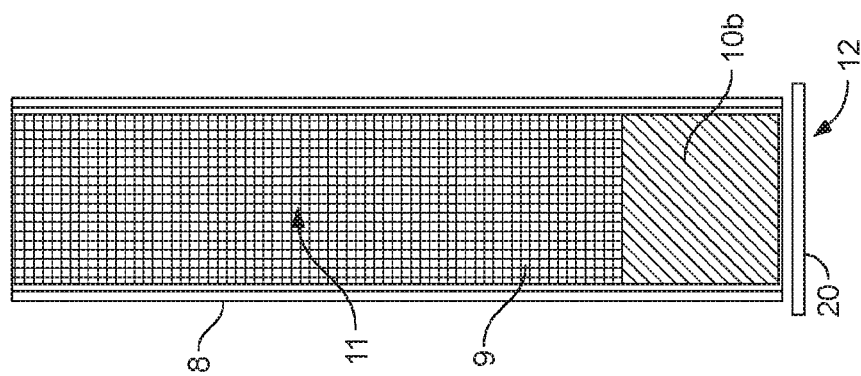
FIG. 2 is a schematic view of a portion of a reactor tube containing catalyst carriers.
Figure 5:
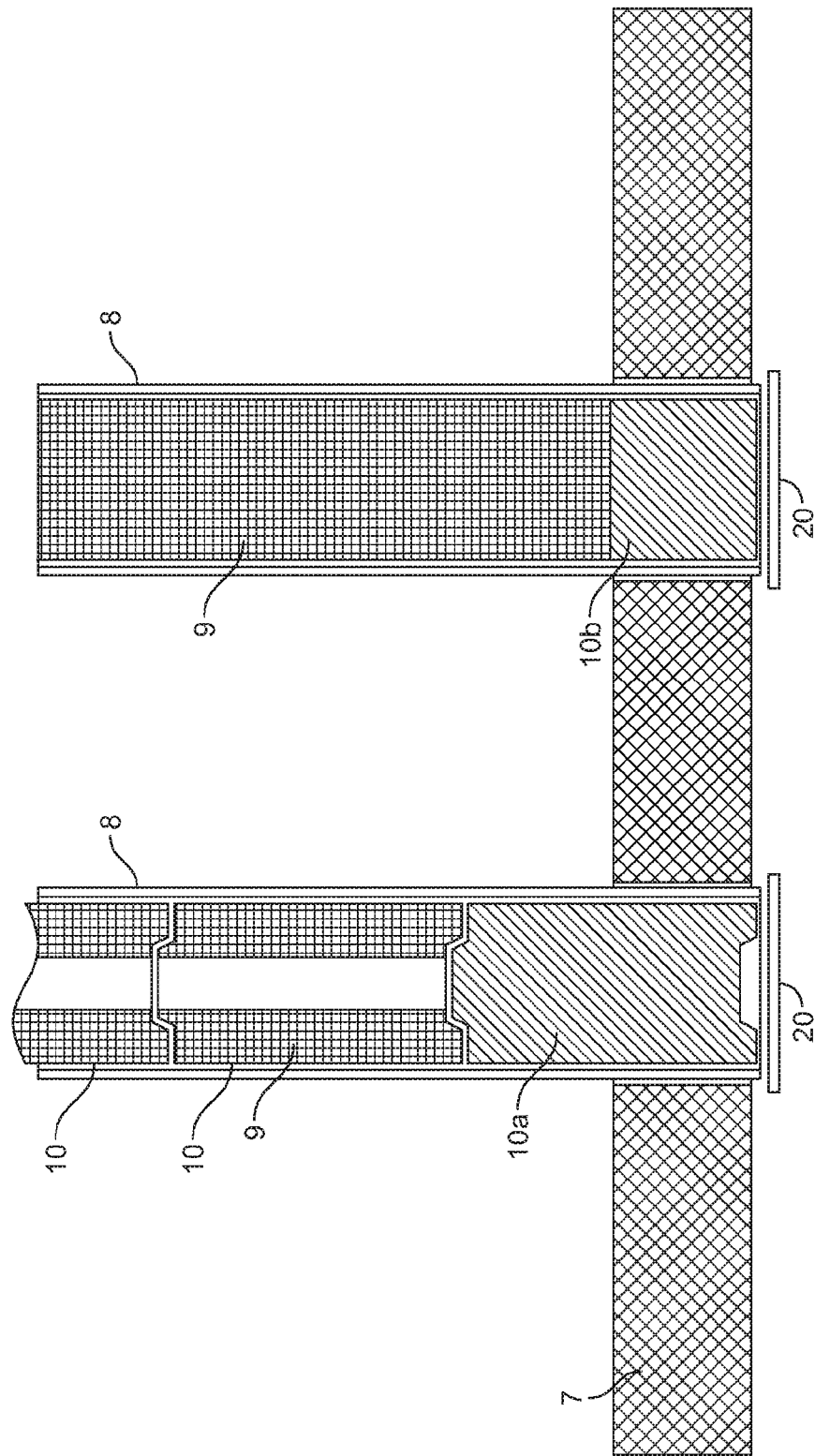
FIG. 5 is a schematic view of a portion of a tubular reactor.

In a first example, as shown in FIG. 2, the catalyst 9 may be packaged in a plurality of catalyst carriers 10. The catalyst carriers 10 may be arranged in a stacked arrangement of catalyst carriers 10 in the bore 11 of each reactor tube 8. One or more supporting devices 10a may be provided at bottom of the stacked arrangement. The supporting device(s) 10a may not contain catalyst 9 and may serve to avoid catalyst 9 being held in the tubular reactor 1 at the level of the lower tube sheet 7, as shown in FIG. 5. In other words the supporting device(s) 10a may help to ensure that all of the catalyst 9 is positioned within the heat exchange zone 4 of the tubular reactor 1.

Figure 10:
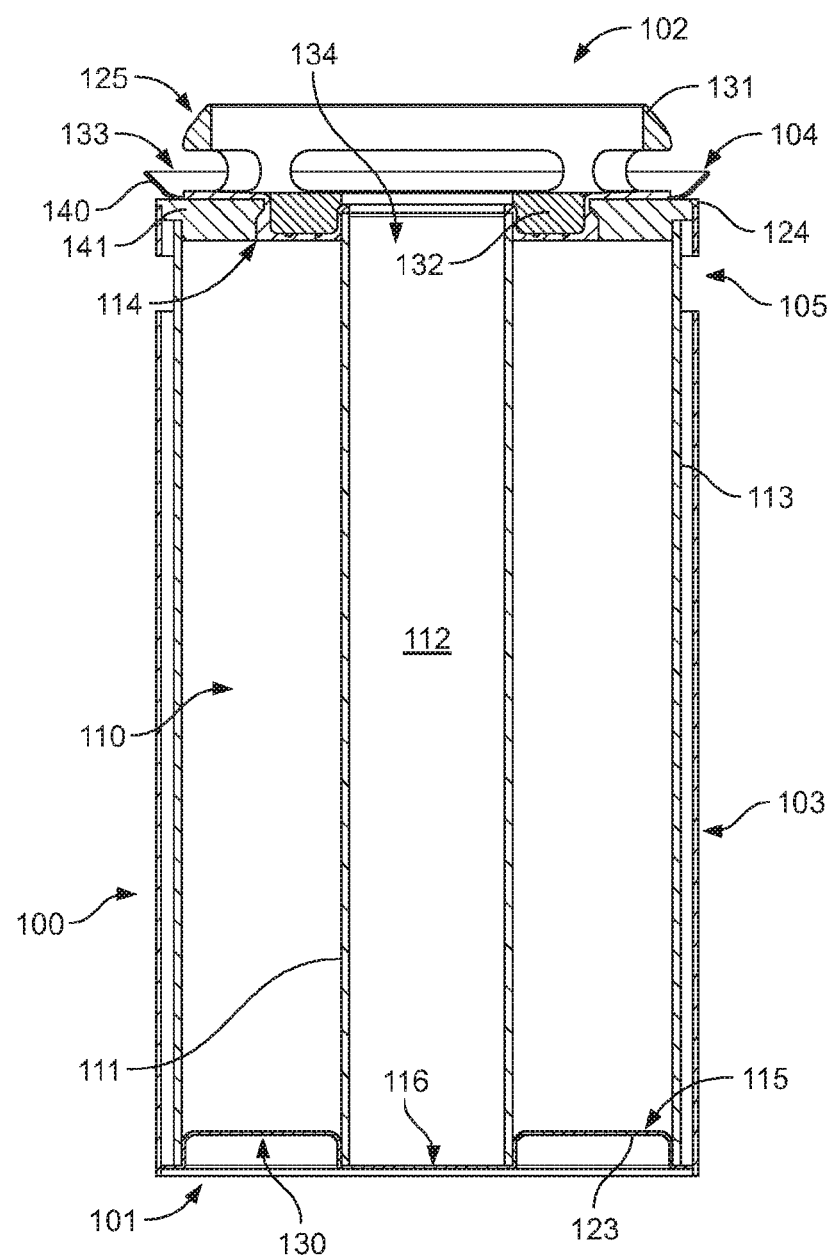
FIG. 10 is a cross-sectional view of a catalyst carrier.
Figure 11:
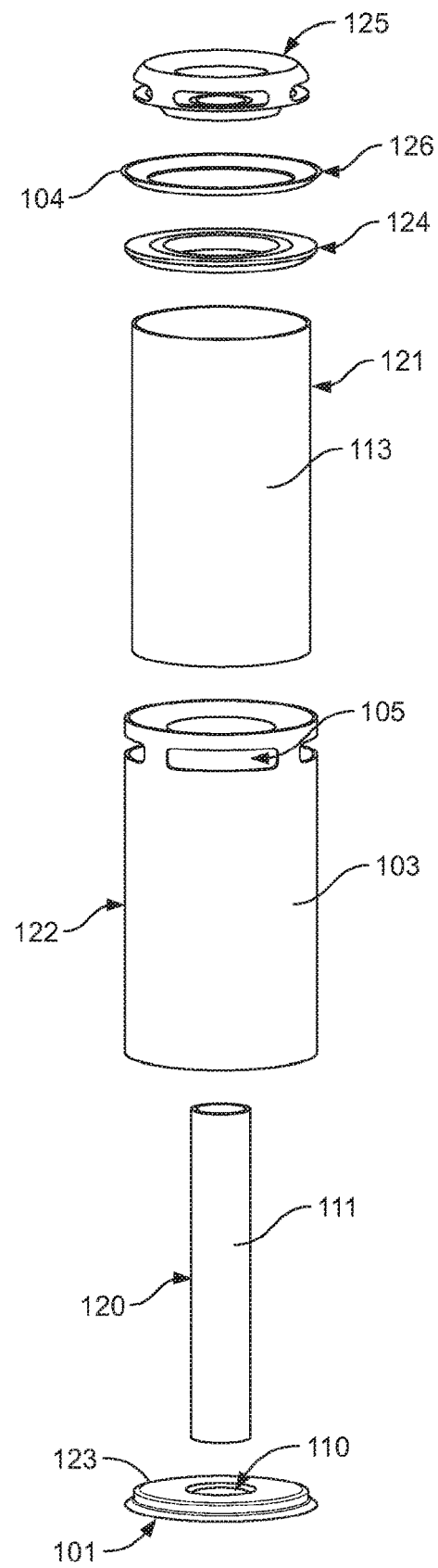
FIG. 11 is an exploded perspective view of the catalyst carrier of FIG. 10.
Figure 12:
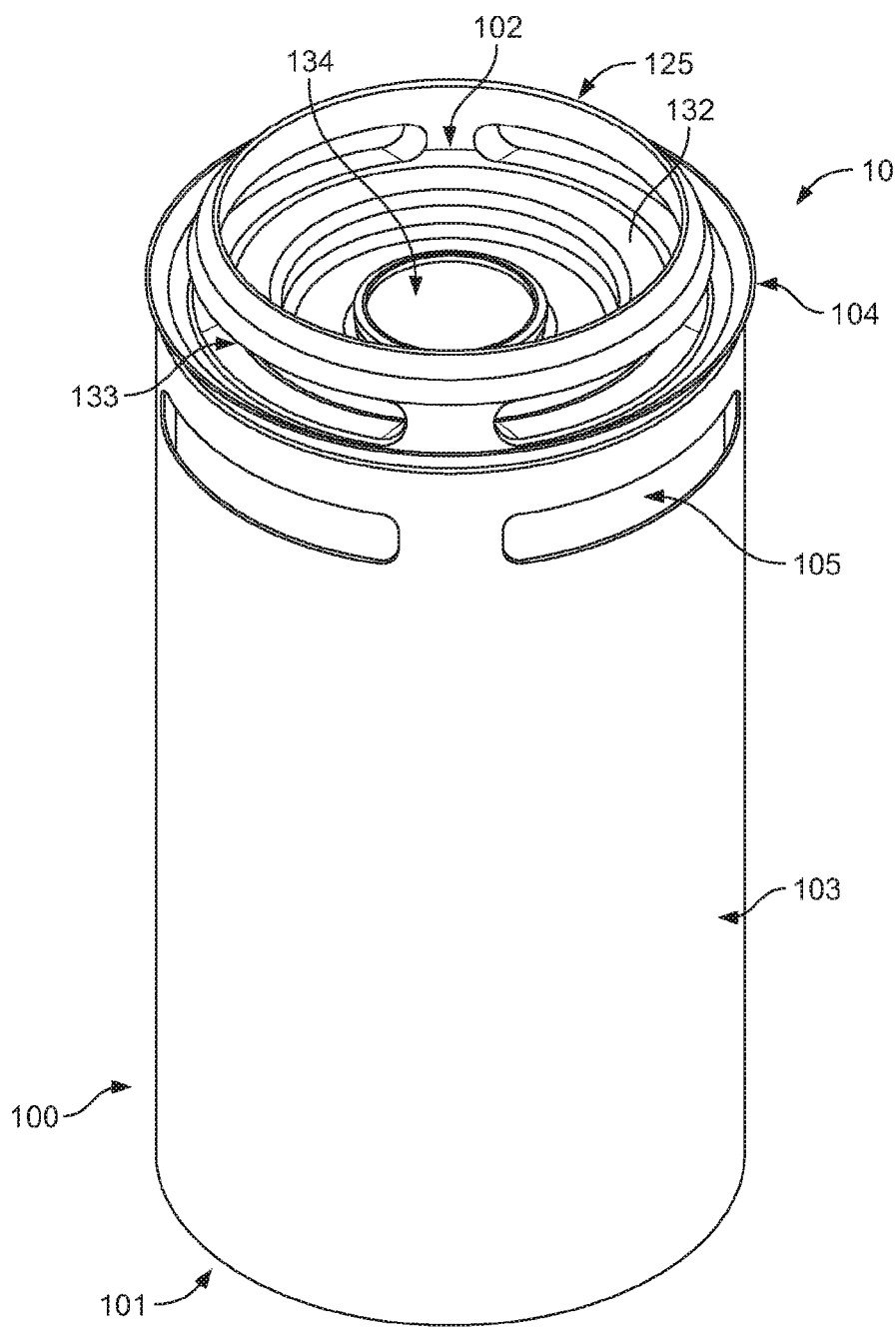
FIG. 12 is a perspective view of the catalyst carrier of FIG. 10.

The catalyst carriers 10 may take a variety of different forms. Suitable examples include those described in WO 2011/048361, WO2012/136971 and WO2016/050520. Another example of a suitable catalyst carrier 10 is shown in FIGS. 10 to 12 and will be described further below.

Each supporting device 10a may take any suitable form. In one example the supporting device 10a may take the same or a similar form to a catalyst carrier 10 but not be filled with catalyst 9.

Figure 3:
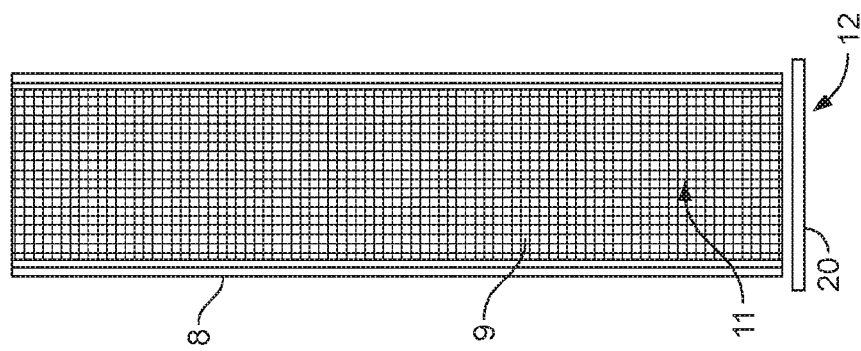
FIG. 3 is a schematic view of a portion of another reactor tube containing catalyst.
Figure 4:
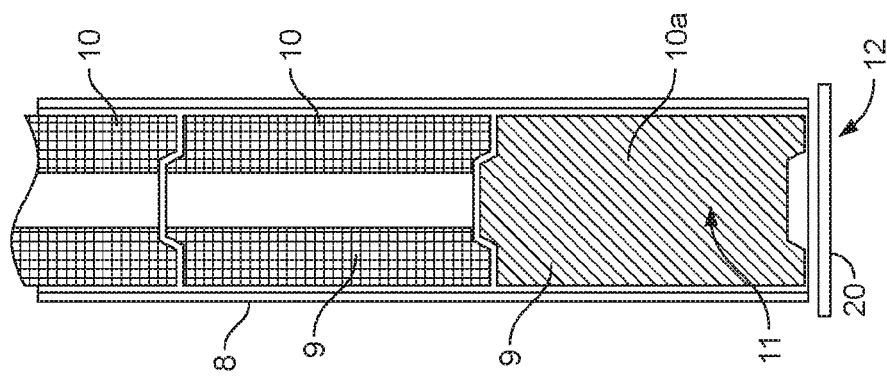
FIG. 4 is a schematic view of a portion of another reactor tube containing catalyst and a supporting device.

In a second example, as shown in FIGS. 3 and 4, the catalyst 9 may be catalyst particles that are filled loose into the bore 11 of each reactor tube 8. One or more supporting devices 10b may be provided at bottom of the bed of particulate catalyst 9 as shown in FIG. 4. As above, the supporting device(s) 10b may serve to prevent catalyst 9 being held in the tubular reactor 1 at the level of the lower tube sheet 7, as shown in FIG. 5. The supporting device(s) 10b may, as a result, help to ensure that all of the catalyst 9 is positioned within the heat exchange zone 4 of the tubular reactor 1.

Each supporting device 10b may take any suitable form. In one example, the supporting device 10b may have a hollow or porous body with at least an upper mesh for supporting the particulate catalyst 9. In another example, the supporting device 10b may comprise an inert support material such as alumina balls which have a larger diameter than the particulate catalyst. The alumina balls may be graded in size to avoid loss of catalyst from the reactor tube 8. For example, for a particulate catalyst having a particle diameter of 3 mm the alumina balls may comprise a layer of 6 mm balls overlying a layer of 13 mm balls overlying a layer of 25 mm balls. In another example, the supporting device 10b may comprise one or more coiled springs which expand against the reactor tube wall and retain the particulate catalyst like a basket.

It is typically desired that the catalyst 9 or catalyst carriers 10 cover all or substantially all of the length of the reactor tube 8 between the upper tube sheet 6 and the lower tube sheet 7, i.e. that they cover all or substantially all of the length of the heat exchange zone 4.

Typically, the loose catalyst 9 or catalyst carriers 10 are loaded into the inlets 13 at the upper ends of the reactor tubes 8 when filling the reactor tubes 8 and discharged from the outlets 12 at the lower ends of the reactor tubes 8 when emptying the reactor tubes 8.

The head space 3 may provide access to an upper end of the reactor tubes 8 to allow loading of the catalyst 9 or catalyst carriers 10 into the reactor tubes 8. The footer space 5 may provide access to a lower end of the reactor tubes 8 to allow unloading of the catalyst 9 or catalyst carriers 10 from the reactor tubes 8.

According to the present disclosure and as shown, by way of example, in FIGS. 2 to 5, each reactor tube 8 has one or more retaining devices 20 associated with it. For example, a single retaining device 20 may control discharge of the catalyst 9 from each reactor tube 8. Alternatively, two, three, four or more retaining devices 20 may be associated with the outlet 12 of each reactor tube 8.

Each retaining device 20 is configured to be rotatable between a first position and a second position. In the first position the retaining device 20 at least partially obstructs the outlet 12 of the reactor tube 8 so as to retain the catalyst 9 within the bore 11. In the second position the outlet 12 is unobstructed sufficiently to permit discharge of the catalyst 9 out of the outlet 12.

The retaining device 20 may be rotatable about an axis that is parallel to, and non-coincident with, a longitudinal axis of the elongate tube 8 that it is associated with.

The retaining device 20 may be positioned at or near the outlet 12 of the reactor tube 8. For example as shown in FIGS. 2 to 5 the retaining device 20 may, in its first position, extend partially or fully across the outlet 12 of the reactor tube 8.

The retaining device 20 may be mounted, directly or indirectly, to the reactor tube 8 and/or the lower tube sheet 7. For example, the retaining device 20 may be mounted to a stud bolt of the lower tube sheet 7.

Each retaining device 20 may be aligned at an interstice between two, optionally between three or four reactor tubes 8.

The retaining device 20 may be formed of any suitable material. Such material will generally be selected to withstand the operating conditions of the reactor. Generally, the retaining device 20 will be fabricated from carbon steel, aluminium, stainless steel, other alloys or any material able to withstand the reaction conditions.

The retaining device 20 may comprise a rotatable body that is rotatable between the first position and the second position. The rotatable body may comprise a central pivot about which the rotatable body is configured to rotate.

The rotatable body may comprise at least one obstructing portion and at least one non-obstructing portion arranged at different circumferential regions of the rotatable body.

In the first position the at least one obstructing portion may be configured to at least partially obstruct the outlet 12 and in the second position the at least one non-obstructing portion may be configured to align with the outlet 12.

Partial obstruction of the outlet 12 in the first position of the rotatable body may be utilised where the catalyst 9 is packaged in catalyst carriers 10 or where a supporting device 10*a*, 10*b* is used to support the catalyst carriers 10 or the bed of particulate catalyst 9, since the preferably rigid form of the catalyst carriers 10 and or supporting devices 10*a*, 10*b* can be effectively retained in the bore 11 by narrowing the aperture of the outlet 12.

Figure 6:
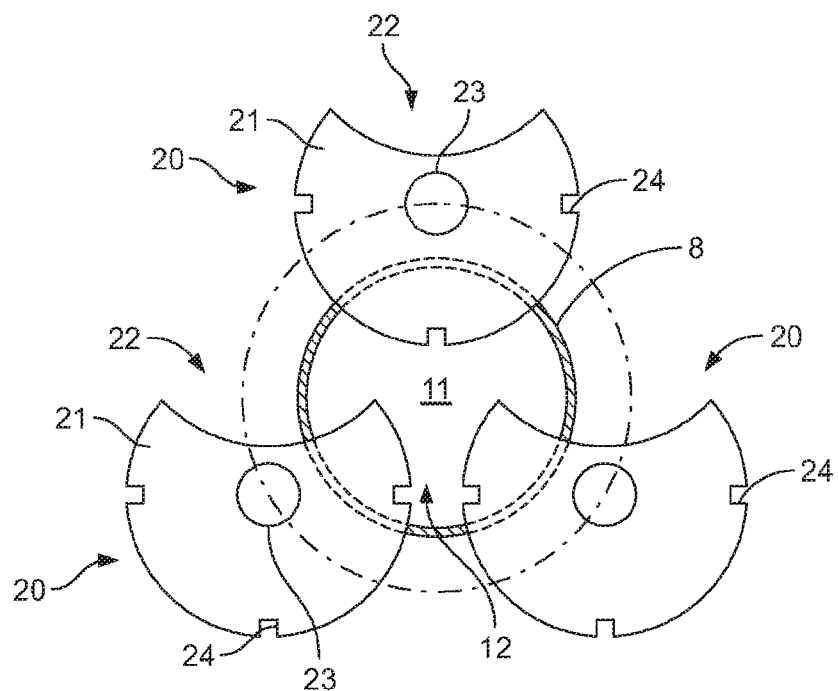
FIG. 6 is a schematic end view of a reactor tube and three retaining devices in a first position.
Figure 7:
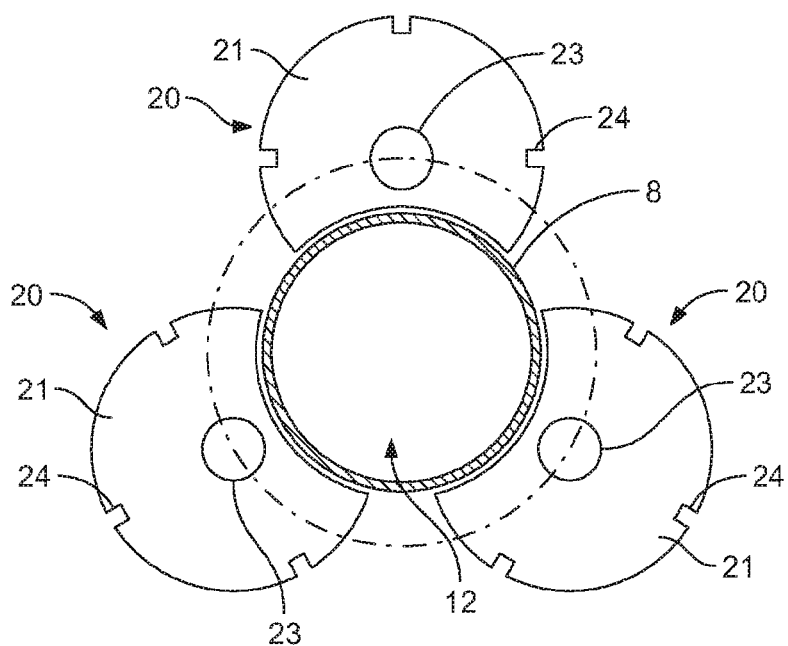
FIG. 7 shows the arrangement of FIG. 6 with the retaining devices in a second position.

One example of the rotatable body is where it comprises a rotatable disc as shown, for example, in FIGS. 6 and 7. FIG. 6 shows an end view of a single reactor tube 8 and three retaining devices 20 that are associated with the outlet 12 of the reactor tube 8.

The three retaining devices 20 may be distributed around the periphery of the reactor tube 8. They may optionally be arranged in an equi-spaced distribution. In the illustrated example, the three retaining devices 20 are about 120° apart from each other.

The rotatable disc may comprise a disc body 21, for example forming an obstructing portion, and at least one aperture 22, forming for example one or more non-obstructing portions. The disc body 21 may be planar. It may be formed, for example, from sheet material. The disc body 21 may have a thickness of 5 to 25 mm.

The disc body 21 may be rotatable about a pivot 23 which may be located at a centre of the disc body 21. The disc body 21 may be lune-shaped, i.e. having the general form of a concave-convex region bounded by two circular arcs.

In the illustrated example of FIGS. 6 and 7 one aperture 22 may be present on each retaining device 20. The aperture 22 may extend to a periphery of the disc body 21 to define a cut-out segment of the rotatable disc. The cut-out segment may be lens-shaped, i.e. having the general form of a convex region bounded by two circular arcs joined to each other at their endpoints.

The disc body 21 may be provided with one or more notches 24 at its peripheral edge. The notches 24 may provide an anchor point for engaging a tool to assist in rotating the disc body 21 from its first position to its second position.

FIG. 6 shows all three retaining devices 20 in their first positions. In its first position each disc body 21 may be configured to at least partially obstruct the outlet 12. This enables retention of, for example, the catalyst carrier 10 within the bore 11. In particular, the position of the pivot 23 and the diameter of the disc body 21 may be configured such that in its first position at least a portion of the disc body 21 extends partly across the outlet 12, and in particular extends sufficiently to prevent passage of the catalyst carrier 10 past the level of the retaining device 20.

FIG. 7 shows all three retaining devices 20 having been rotated into their second positions. In its second position the aperture 22 of each retaining device 20 may be aligned with the outlet 12. In particular, the alignment is such as to create a large enough window between the retaining devices 20 to allow passage of the catalyst carrier 10 past the level of the retaining device 20 and out of the reactor tube 8.

In practice the tubular reactor 1 comprises a large number of reactor tubes 8. The reactor tubes 8 are typically arranged in a regular array between the upper tube sheet 6 and the lower tube sheet 7. When viewed end-on, e.g. when viewing the lower tube sheet 7 from below, the reactor tubes 8 may be arranged in a regular pattern. The gaps between neighbouring reactor tube 8 may be constant and equal. The reactor tubes 8 may be arranged in a quadrilateral-based pattern, for example on a square pitch, in which the reactor tubes 8 form rows and columns and each reactor tube 8 has up to eight neighbouring reactor tubes 8. Alternatively, in another example, the reactor tubes 8 may be arranged on a triangular pitch in which the reactor tubes 8 are formed in triangular-sub-units of three reactor tubes 8 and each reactor tube 8 has up to six neighbouring reactor tubes 8. It will be understood that other arrangements are possible.

Figure 8:
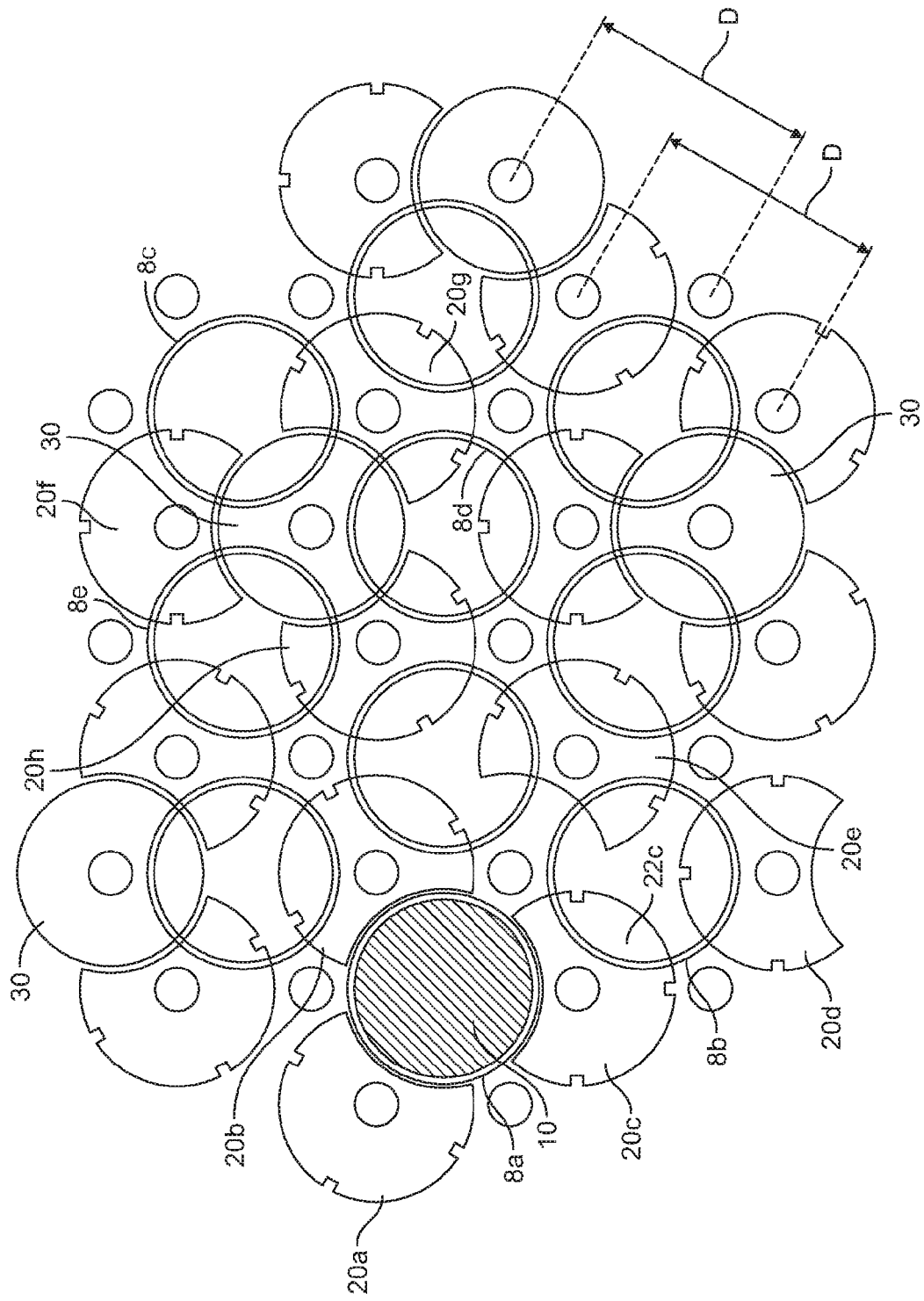
FIG. 8 is a schematic end view of a plurality of reactor tubes and retaining devices.

FIG. 8 shows an end view of a portion of a tubular reactor 8 in which a plurality of reactor tubes 8 are arranged on a triangular pitch. FIG. 8 illustrates how each retaining device 20 may be associated with more than one reactor tube 8. Each retaining device 20 is aligned at an interstice between three reactor tubes 8.

The reactor tubes 8 may be arranged in an equi-spaced regular pattern with each pair of reactor tubes 8 being separated by a centre-to-centre uniform distance, D and the retaining devices 20 may also arranged in an equi-spaced regular pattern with each pair of retaining devices 20 being separated by the centre-to-centre uniform distance, D. However, it will be noted, and as shown in FIG. 8 by way of example, that the equi-spaced regular pattern of the retaining devices 20 is offset from the equi-spaced regular pattern of reactor tubes 8.

For example, as shown reactor tube 8*a* has three retaining devices 20*a*, 20*b* and 20*c* associated with it. Reactor tube 8*b* also has three retaining devices 20*c*, 20*d* and 20*e* associated with it. It will be noted that retaining device 20*c* is associated with both reactor tubes 8*a* and 8*b*.

As shown in FIG. 8, reactor tube 8*a* is free to discharge its catalyst carriers 10 since the retaining devices 20*a*, 20*b* and 20*c* are all in their second position with respect to reactor tube 8*a*, i.e. their apertures are aligned with the outlet 12 of reactor tube 8*a*. At the same time retaining device 20*c* is in its first position with respect to reactor tube 8*b* because its disc body 22*c* partially obstructs the outlet 12 of reactor tube 8*b*.

Hence it can be seen that the retaining devices 20 may be selectively operated to control discharge of the catalyst from desired reactor tubes 8 by selective rotation of the retaining devices 20.

The retaining devices 20 may be configured to each be rotatable independently of each other. For example, each retaining device 20 may be manually rotated by an operator, for example by engaging a hand tool in the notches 24 of a particular retaining device 20.

Alternatively, two or more of the retaining devices 20 may be interlinked to be rotatable synchronously. For example, two of more retaining devices 20 may be interlinked by a link member. A single link member may rotate a group of retaining devices 20, for example some or all retaining devices 20 in a single row or column or in a single triangular sub-unit, may be rotated by operation of a single link member.

The tubular reactor 1 may further be provided with a plurality of locking elements 30 for selectively preventing rotation of the retaining devices 20. In the illustrated example of FIG. 8, each locking element 30 may comprise a locking body that can be engaged against one or more retaining devices 20 to block rotation of said retaining devices 20. Each locking element 30 may be shaped and sized to inter-engage and or interlock with one or more of the retaining devices 20. For example, the shape of the locking element 30 may be shaped to interlock with the disc body 21 of one or more retaining devices 20. As illustrated in FIG. 8, the locking element 30 may be a circular disc that may interlock with the disc bodies 21 of one, two or three neighbouring retaining devices 20, i.e. by occupying the voids of the apertures 22.

The locking elements 30 may be movable between a locked position and an unlocked position. The movement may be in a direction perpendicular to the plane of the retaining devices 20. For example, moving the locking elements 30 into their unlocked position may comprise raising or lowering the locking elements 30 out of the plane of the disc bodies 21.

The locking elements 30 may be interlinked to be moved synchronously.

The locking elements 30 may be arranged in an equi-spaced regular pattern.

Figure 9:
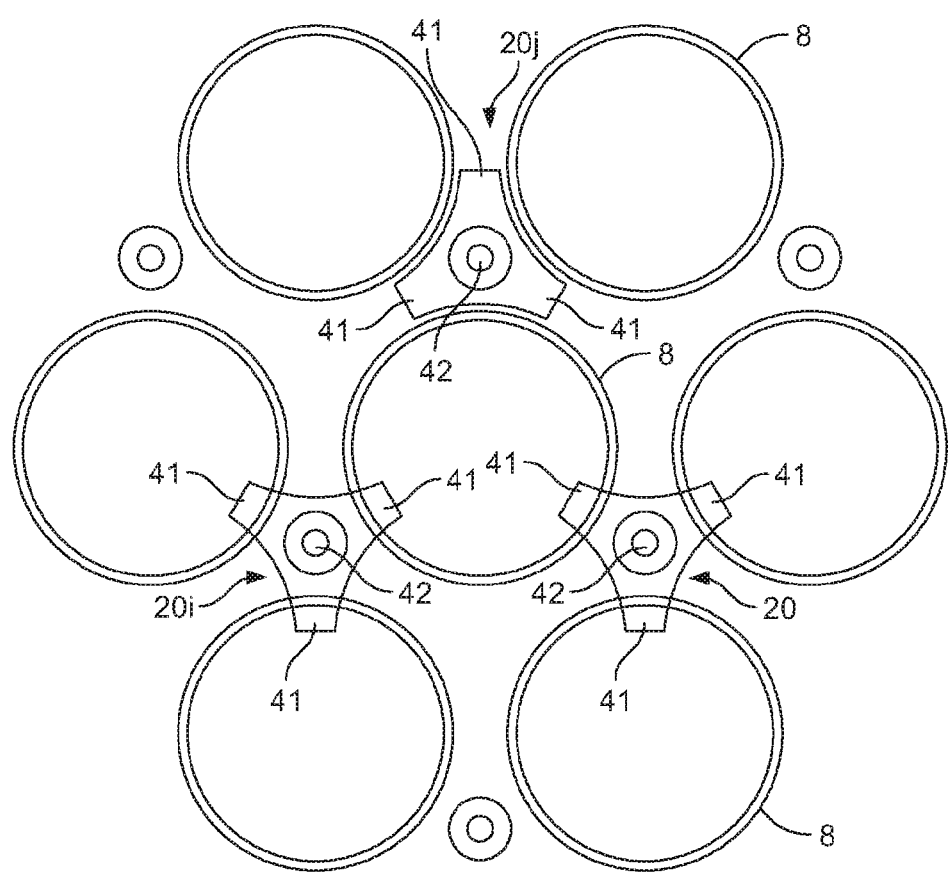
FIG. 9 is a schematic end view of a plurality of reactor tubes and a plurality of retaining devices of a different type.

Another example of the rotatable body is where it comprises at least one arm or lobe as shown, for example, in FIG. 9. FIG. 9 shows an end view of a portion of a tubular reactor 8 in which the reactor tubes are arranged on a triangular pitch. FIG. 9 illustrates how each retaining device 20 may be associated with more than one reactor tube 8.

Three retaining devices 20 may be distributed around the periphery of each reactor tube 8. They may optionally be arranged in an equi-spaced distribution. In the illustrated example the three retaining devices 20 are about 120° apart from each other.

As illustrated, each rotatable body comprises three arms or lobes 41. The three arms or lobes 41 may be about 120° apart from each other. The rotatable body may be rotatable about a pivot 42 which may be located at a centre of the rotatable body.

In other examples each rotatable body may comprise one, two, four or more arms or lobes 41. Optionally the number of arms or lobes 41 may equal the number of neighbouring reactor tubes 8 with which the rotatable body is associated. i.e. a rotatable body 8 located at an interstice between three reactor tubes 8 may have three arms or lobes 41.

As noted above, the retaining devices 20 may be mounted, directly or indirectly, to the lower tube sheet 7. As illustrated, the retaining devices 20 are mounted, by way of example to stud bolts comprising a part of a support framework coupled to the lower tube sheet 7.

Each retaining device 20 is configured to be rotatable between a first position and a second position. In the first position the or each arm or lobe 41 may be configured to at least partially obstruct an outlet 12 of a reactor tube 8 for retaining the catalyst 9 within the bore 11. In the second position the or each arm or lobe 41 may be configured to be non-aligned with the outlet 12.

In its first position the or each arm or lobe 41 may extend across one, two or more associated reactor tubes 8. The or each arm or lobe 41 may be straight or curved.

FIG. 9 shows a retaining device 20*i* in its first position. In its first position each arm or lobe 41 may be configured to at least partially obstruct an outlet 12 of a neighbouring reactor tube 8. This enables retention of, the catalyst 9, the catalyst carrier 10, or supports 10*a* or 10*b*, within the bore 11. In particular, the position of the pivot 42 and the length of the arms or lobes 41 may be configured such that in its first position at least a distal portion of the arm or lobe 41 extends partly across the outlet 12, and in particular extends sufficiently to prevent passage of the catalyst carrier 10 or supports 10*a* or 10*b* past the level of the retaining device 20. In its first position, the arms or lobes 41 may therefore be configured to support an endmost one of the plurality of catalyst carriers 10. The support may be a direct support of the endmost one of the plurality of catalyst carriers 10 by contacting the endmost one of the plurality of catalyst carriers 10, or may be an indirect support of the endmost one of the plurality of catalyst carriers 10 by contacting a supporting device 10*a* that itself supports the endmost one of the plurality of catalyst carriers 10.

FIG. 9 shows a retaining device 20*j* in its second position. In its second position the arms or lobes 41 are rotated out of alignment with the outlets 12 to allow passage of the catalyst 9 or catalyst carrier 10 past the level of the retaining device 20 and out of the reactor tube 8.

Hence, similar to the previous examples, it can be seen that the retaining devices 20 may be selectively operated to control discharge of the catalyst 9 from desired reactor tubes 8 by selective rotation of the retaining devices 20.

As before, the retaining devices 20 may be configured to each be rotatable independently of each other. For example, each retaining device 20 may be manually rotated by an operator. Alternatively, two or more of the retaining devices 20 may be interlinked to be rotatable synchronously. For example, two of more retaining devices 20 may be interlinked by a link member. A single link member may rotate a group of retaining devices 20, for example some or all retaining devices 20 in a single row or column or in a single triangular sub-unit, may be rotated by operation of a single link member.

In use, catalyst 9 (either loose or packaged in, for example, catalyst carriers 10) may be loaded into each reactor tube 8 of the tubular reactor 1 by rotating at least one retaining device 20 associated with that reactor tube 8 into its first position in which it at least partially obstructs the outlet 12. Then the catalyst 9 may be loaded into the reactor tube 8 such that it is retained and optionally supported by the retaining device 20. To unload the reactor tube 8, the retaining device 20 may be rotated into its second position in which the outlet 12 is sufficiently unobstructed so that the catalyst 9 is discharged out of the outlet 12.

Where two of more retaining devices 20 are associated with a single reactor tube 8 then one or more or all of the associated retaining devices 20 may be moved into their first position before loading the catalyst 9.

Unloading of the reactor tubes 8 may be carried out one at a time by selectively rotating the retaining devices 20 to sufficiently unobstruct the outlet 12 of only one reactor tube 8 at a time. Alternatively, the reactor tubes 8 may be unloaded two or more at a time by selectively rotating the retaining devices 20 to sufficiently unobstruct the outlets 12 of two or more reactor tubes 8 at the same time.

As noted above, the catalyst 9 may be packaged in a catalyst carrier 10. An example of a suitable catalyst carrier 10 is shown, by way of example, in FIGS. 10 to 12. However, as already noted above, it will be understood that according to the present disclosure the catalyst carriers 10 may take various forms. For example, as well as the examples described herein the catalyst carriers 10 may take other forms including but not limited to those disclosed in WO2011/048361, WO2012/136971 and WO2016/050520, the contents of which are herein incorporated by reference in their entirety.

The catalyst carrier 10 may generally comprise a container that is sized such that it is of a smaller dimension than the internal dimension of the reactor tube 8 into which it is to be placed in use. Typically, a seal will be provided that is sized such that it interacts with the inner wall of the reactor tube 8 when the catalyst carrier 10 is in position within the reactor tube 8. Parameters such as carrier length and diameter may be selected to accommodate different reactions and configurations of reactor tube 8.

As shown in FIGS. 10 to 12, the catalyst carrier 10 may comprise a container 100 for holding catalyst in use. The container 100 may generally have a bottom surface 101 that closes a lower end of the container 100 and a top surface 102 at an upper end of the container 100. A carrier outer wall 103 may extend from the bottom surface 101 to the top surface 102. A seal 104 may extend from the container 100 by a distance which extends beyond the carrier outer wall 103. The carrier outer wall 103 may have apertures 105 located below the seal 104.

As shown in FIG. 10, in at least some embodiments the catalyst carrier 10 may more particularly comprise an annular container 110 for holding catalyst in use. The annular container 110 may comprise a perforated inner container wall 111 that defines an inner channel 112 and a perforated outer container wall 113 that may be concentrically arranged about the perforated inner container wall 111. An annular top surface 114 may close an upper end of the annular container 110 and an annular bottom surface 115 may close a lower end of the annular container 110. A lower end of the inner channel 112 may be closed off by a channel end surface 116 except for one or more drain apertures (not shown) that may be provided in the lower end of the inner channel 112. The channel end surface 116 may be formed integrally or separately to the inner container wall 111.

As shown in the exploded view of FIG. 11, the catalyst carrier 10 may be formed from a number of individual components that may be assembled together by any suitable means, including for example welding. In some embodiments such components may include a perforated inner tube 120, a perforated intermediate tube 121, an outer tube 122, a bottom cap 123, an annular top ring 124, a top cap 125 and an annular seal ring 126.

The catalyst carrier 10 may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

Suitable thicknesses for the components will be of the order of about 0.1 mm to about 1.0 mm, preferably of the order of about 0.3 mm to about 1.0 mm.

The perforated inner tube 120 may comprise the perforated inner container wall 111. The perforated intermediate tube 121 may comprise the perforated outer container wall 113. The outer tube 122 may comprise the carrier outer wall 103 and define the apertures 105. The bottom cap 123 may comprise the bottom surface 101 and or the annular bottom surface 115. The bottom cap 123 may also extend across the perforated inner tube 120 to comprise the channel end surface 116. The annular top ring 124 and the top cap 125 may comprise the annular top surface 114 and may comprise at least part of the top surface 102. The annular seal ring 126 may comprise the seal 104.

The size of the perforations in the perforated inner tube 120 and the perforated intermediate tube 121 will be selected such as to allow uniform flow of reactant(s) and product(s) through the catalyst while maintaining the catalyst within the annular container 110. It will therefore be understood that their size will depend on the size of the catalyst particles being used. In an alternative arrangement the perforations may be sized such that they are larger but have a filter mesh covering the perforations to ensure catalyst is maintained within the annular container 110.

It will be understood that the perforations may be of any suitable configuration. Indeed where a wall or tube is described as perforated all that is required is that there is means to allow the reactants and products to pass through the walls or tubes.

The bottom surface 101, for example the bottom cap 123, may be shaped to engage with an upper end of another catalyst carrier 10. For example the bottom surface 101 may comprise an annular recess 130 around the perforated inner tube 120. The top cap 125 may be shaped to engage in the annular recess 130 of another catalyst carrier 10. For example the top cap 125 may comprise an annular ring 131 that upstands from an annular plug body 132. The annular ring 131 may be shaped and sized to be received in the annular recess 130.

The bottom surface 101, for example the bottom cap 123 and or channel end surface 116 may include one or more drain holes. Where one or more drain holes are present, they may be covered by a filter mesh.

The annular top ring 124 may be shaped and sized to engage in an upper end of the outer tube 122. The annular plug body 132 of the top cap 125 may have an outer diameter configured to engage with a central aperture of the annular top ring 124. Engagement of the top cap 125 with the annular top ring 124 may function to sandwich and retain the annular seal ring 126 in position.

The top cap 125 may comprise a central inlet 134 in the annular plug body 132 for enabling entry of liquids and gases into the upper end of the inner channel 112. The annular ring 131 may comprise lateral apertures 133 than enable liquids and gases to reach the central inlet 134.

The carrier outer wall 103 may be smooth or it may be shaped. Suitable shapes include pleats, corrugations, and the like.

The apertures 105 in the carrier outer wall 103 may be of any configuration. In some embodiments, the apertures 105 may be holes or slots.

The seal 104 may be formed in any suitable manner. However, it will generally be sufficiently compressible to accommodate the smallest diameter of the reactor tube 8. The seal 104 will generally be a flexible, sliding seal. In some embodiments the seal 104 may comprise a deformable flange 140 extending from the carrier outer wall 103 or the top surface 102 of the catalyst carrier 10. The flange 140 may be sized to be larger than the internal diameter of the reactor tube 8 such that as the catalyst carrier 10 is inserted into the reactor tube 8 it is deformed to fit inside and interact with the reactor tube 8.

In the illustrated example of FIG. 10, the deformable flange 140 comprises an outer portion of the annular seal ring 126. An inner portion 141 of the annular seal ring 126 may define a clamping surface that is sandwiched and retained between the top cap 125 and the annular top ring 124. The deformable flange 140 may be angled relative to the inner portion 141. The deformable flange 140 may be angled towards the upper end of the catalyst carrier 10.

The carrier outer wall 103 may continue above the seal 104. Thus the seal 104 may be located at the top of the catalyst carrier 10, optionally as part of the top surface 102, or it may be located at a suitable point on the carrier outer wall 103 provided that it is located above the apertures 105 in the carrier outer wall 103.

During insertion into the reactor tube 8, the seal 104 of the catalyst carrier 10 may sealingly engage with the inner surface of the reactor tube 8. In particular, engagement of the seal 104 against the reactor tube 8 may cause deformation of the seal 104.

The deformation of the seal 104 may produce resistive forces that may help to maintain the axial position of the catalyst carriers 10 within the reactor tube 8 after installation. In addition, the deformation of the seal 104 may be used to promote a liquid-tight and or gas-tight seal between the upper end of the catalyst carriers 10 and the inner surface of the reactor tube 8.

Once installed in the reactor tube 8, the catalyst carriers 10 may form a stacked arrangement, one on top of the other with their longitudinal axes aligned and coincident. As noted above, the stack of catalyst carriers 10 may be directly or indirectly supported by the retaining devices 20 when in their first positions.

In use in a tubular reactor 1 with downflow, reactant(s) flow downwardly through the reactor tube 8 and thus first contact the top surface 102 of the uppermost catalyst carrier 10 in the stacked formation. The seal 104 blocks the passage of the reactant(s) around the side of the catalyst carrier 10. Therefore, the top surface 102 directs the reactants inwardly through the lateral apertures 133 into the central inlet 134 at the upper end of the inner channel 112 within the inner container wall 111 defined by the perforated inner tube 120.

The reactant(s) then enters the annular container 110 through the perforated inner tube 120 and then passes radially through the catalyst bed towards the outer container wall 113 defined by the perforated intermediate tube 121. During this passage the reactant(s) contact the catalyst and reaction occurs to form product(s).

Unreacted reactant and product then flow out of the annular container 110 through the perforated intermediate tube 121. The carrier outer wall 103 defined by the outer tube 122 then directs reactant and product upwardly between the inner surface of the carrier outer wall 103 and the perforated intermediate tube 121 until they reach the apertures 105 in the carrier outer wall 103. They are then directed through the apertures 105 and flow downwardly between the outer surface of the carrier outer wall 103 and the inner surface of the reactor tube 8 where heat transfer takes place.

The unreacted reactants and products may then contact the top surface 102 of the underlying catalyst carrier 10 in the stacked formation and the process described above may repeat. This pattern may repeat as the reactant(s) and product (s) pass down the stacked formation until then are collected out of the lower end of the reactor tube 8.

Some of the products, especially liquid products may drain out of the inner channel 112 through the drain hole provided in the channel end surface 116 into the inner channel 112 of the underlying catalyst carrier 10. Such products may then continue to drain down the stacked formation of the catalyst carriers 10 and be collected out of the outlet 12 at the lower end of the reactor tubes 8.

Further aspects and embodiments of the present disclosure are set out in the following clauses:

Clause 1. A reactor tube for a tubular reactor and a retaining device associated with the reactor tube;
  the reactor tube in the form of an elongate tube defining a bore for receiving in use a catalyst and having an outlet at one end of the bore for discharging the catalyst out of the bore;
  the retaining device being configured to be rotatable between a first position and a second position;
  wherein in the first position the retaining device at least partially obstructs the outlet for retaining the catalyst within the bore; and
  in the second position the outlet is unobstructed sufficiently for permitting discharge of the catalyst out of the outlet.

Clause 2. The reactor tube and retaining device of clause 1, wherein the retaining device is rotatable about an axis that is parallel to, and non-coincident with, a longitudinal axis of the elongate tube.

Clause 3. The reactor tube and retaining device of clause 1 or clause 2, wherein the retaining device comprises a rotatable body that is rotatable between the first position and the second position.

Clause 4. The reactor tube and retaining device of clause 3, wherein the rotatable body comprises at least one obstructing portion and at least one non-obstructing portion arranged at different circumferential regions of the rotatable body;
  wherein in the first position the at least one obstructing portion is configured to at least partially obstruct the outlet and in the second position the at least one non-obstructing portion is configured to align with the outlet.

Clause 5. The reactor tube and retaining device of clause 3 or clause 4, wherein the rotatable body comprises a central pivot about which the rotatable body is configured to rotate.

Clause 6. The reactor tube and retaining device of any one of clauses 3 to 5, wherein the rotatable body comprises a rotatable disc.

Clause 7. The reactor tube and retaining device of clause 6, wherein the rotatable disc comprises a disc body and at least one aperture;
  wherein in the first position the disc body is configured to at least partially obstruct the outlet for retaining the catalyst within the bore and in the second position the at least one aperture is configured to align with the outlet.

Clause 8. The reactor tube and retaining device of clause 7, wherein the at least one aperture is an at least one open aperture that extends to a periphery of the disc body to define at least one cut-out segment of the rotatable disc.

Clause 9. The reactor tube and retaining device of clause 8, wherein the or each cut-out segment of the rotatable disc is lens-shaped.

Clause 10. The reactor tube and retaining device of any one of clauses 7 to 9, wherein the disc body is lune-shaped.

Clause 11. The reactor tube and retaining device of any one of clauses 7 to 10, wherein the rotatable body comprises one, two, three or four apertures.

Clause 12. The reactor tube and retaining device of any one of clauses 3 to 11, wherein the rotatable body comprises an arm or lobe;
  wherein in the first position the arm or lobe is configured to at least partially obstruct the outlet for retaining the catalyst within the bore and in the second position the arm or lobe is configured to be non-aligned with the outlet.

Clause 13. The reactor tube and retaining device of clause 12, wherein the rotatable body comprises two, three or four arms or lobes.

Clause 14. The reactor tube and retaining device of any preceding clause, wherein the bore is configured to receive in use the catalyst in the form of a plurality of catalyst carriers that contain the catalyst and are insertable into the bore;
  wherein in the first position the retaining device at least partially obstructs the outlet so as to retain the plurality of catalyst carriers within the bore; and
  in the second position the outlet is unobstructed sufficiently so as to permit discharge of the plurality of catalyst carriers out of the outlet.

Clause 15. The reactor tube and retaining device of clause 14, wherein in the first position the retaining device is configured to support an endmost one of the plurality of catalyst carriers.

Clause 16. The reactor tube and retaining device of clause 15, wherein in the first position the retaining device:
- directly supports the endmost one of the plurality of catalyst carriers by contacting the endmost one of the plurality of catalyst carriers; or
- indirectly supports the endmost one of the plurality of catalyst carriers by contacting a supporting device that itself supports the endmost one of the plurality of catalyst carriers.

Clause 17. The reactor tube and retaining device of any one of clauses 1 to 13, wherein the bore is configured to receive in use the catalyst in the form of catalyst particles that are filled loose into the bore;
- wherein in the first position the retaining device at least partially obstructs the outlet so as to retain the catalyst particles within the bore; and
- in the second position the outlet is unobstructed sufficiently so as to permit discharge of the catalyst particles out of the outlet.

Clause 18. The reactor tube and retaining device of clause 17, further comprising a supporting device that supports the catalyst particles within the bore;
- wherein in the first position the retaining device at least partially obstructs the outlet so as to retain the supporting device and hence the catalyst particles within the bore; and
- in the second position the outlet is unobstructed sufficiently so as to permit discharge of the supporting device and thereafter the catalyst particles out of the outlet.

Clause 19. A tubular reactor comprising a plurality of reactor tubes and a plurality of retaining devices;
- each reactor tube comprising an elongate tube defining a bore for receiving in use a catalyst and having an outlet at one end of the bore for discharging the catalyst out of the bore;
- each retaining device being associated with one or more reactor tubes and being configured to be rotatable between a first position and a second position;
- wherein in its first position each retaining device at least partially obstructs the outlet of one, some or all of its one or more associated reactor tubes for retaining the catalyst within the bore of one, some or all of its one or more associated reactor tubes; and
- in its second position the outlet of at least one of its one or more associated reactor tubes is unobstructed sufficiently for permitting discharge of the catalyst out of said outlet.

Clause 20. The tubular reactor of clause 19, wherein in its first position each retaining device at least partially obstructs the outlet of all of its one or more associated reactor tubes for retaining the catalyst within the bore of all of its one or more associated reactor tubes.

Clause 21. The tubular reactor of clause 19 or clause 20, wherein in its second position the outlet of at least two or all of its one or more associated reactor tubes are unobstructed sufficiently for permitting discharge of the catalyst out of said outlets.

Clause 22. The tubular reactor of any one of clauses 19 to 21, wherein each reactor tube has two, three or four retaining devices associated with its outlet.

Clause 23. The tubular reactor of any one of clauses 19 to 22, wherein the plurality of retaining devices are each rotatable independently of each other.

Clause 24. The tubular reactor of any one of clauses 19 to 22, wherein two or more of the plurality of retaining devices are interlinked to be rotatable synchronously.

Clause 25. The tubular reactor of clause 24, wherein the two of more retaining devices are interlinked by a link member, wherein the link member is actuatable to rotate the two or more retaining devices.

Clause 26. The tubular reactor of any one of clauses 19 to 25, wherein the plurality of reactor tubes are arranged in an equi-spaced regular pattern with each pair of reactor tubes being separated by a centre-to-centre uniform distance, D;
- the plurality of retaining devices are also arranged in an equi-spaced regular pattern with each pair of retaining devices being separated by the centre-to-centre uniform distance, D; and
- the equi-spaced regular pattern of the retaining devices is offset from the equi-spaced regular pattern of reactor tubes.

Clause 27. The tubular reactor of any one of clauses 19 to 26, wherein each retaining device is aligned at an interstice between two, optionally between three or four reactor tubes.

Clause 28. The tubular reactor of any one of clauses 19 to 27, wherein each retaining device is rotatable about an axis that is parallel to, and non-coincident with, the longitudinal axes of the elongate tubes.

Clause 29. The tubular reactor of any one of clauses 19 to 28, wherein each retaining device comprises a rotatable body that is rotatable between its first position and its second position.

Clause 30. The tubular reactor of clause 29, wherein each rotatable body comprises at least one obstructing portion and at least one non-obstructing portion arranged at different circumferential regions of the rotatable body;
- wherein in its first position the at least one obstructing portion is configured to at least partially obstruct the outlet of one, some or all of its one or more associated reactor tubes and in its second position the at least one non-obstructing portion is configured to align with the outlet of one, some or all of its one or more associated reactor tubes.

Clause 31. The tubular reactor of clause 29 or clause 30, wherein each rotatable body comprises a central pivot about which the rotatable body is configured to rotate.

Clause 32. The tubular reactor of any one of clauses 29 to 31, wherein each rotatable body comprises a rotatable disc.

Clause 33. The tubular reactor of clause 32, wherein the rotatable disc comprises a disc body and at least one aperture;
- wherein in its first position the disc body is configured to at least partially obstruct the outlet of one, some or all of its one or more associated reactor tubes and in its second position the at least one aperture is configured to align with the outlet of one, some or all of its one or more associated reactor tubes.

Clause 34. The tubular reactor of clause 33, wherein the at least one aperture is an at least one open aperture that extends to a periphery of the disc body to define at least one cut-out segment of the rotatable disc.

Clause 35. The tubular reactor of clause 34, wherein the or each cut-out segment of the rotatable disc is lens-shaped.

Clause 36. The tubular reactor of any one of clauses 33 to 35, wherein each disc body is lune-shaped.

Clause 37. The tubular reactor of any one of clauses 29 to 36, wherein each rotatable body comprises one, two, three or four apertures.

Clause 38. The tubular reactor of any one of clauses 29 to 37, wherein each rotatable body comprises an arm or lobe; wherein in the first position the arm or lobe is configured to at least partially obstruct the outlet of one, some or all of its one or more associated reactor tubes and in the second position the arm or lobe is configured to be non-aligned with the outlet of one, some or all of its one or more associated reactor tubes.

Clause 39. The tubular reactor of clause 38, wherein in its first position the arm or lobe extends across two or more associated reactor tubes.

Clause 40. The tubular reactor of clause 38 or clause 39, wherein the arm or lobe is straight or curved.

Clause 41. The tubular reactor of any one of clauses 38 to 40, wherein each rotatable body comprises two, three or four arms or lobes.

Clause 42. The tubular reactor of any one of clauses 19 to 41, further comprising a tube sheet supporting the plurality of reactor tubes;
wherein the plurality of retaining devices are mounted to the tube sheet.

Clause 43. The tubular reactor of clause 42, wherein the plurality of retaining devices are mounted to stud bolts of the tube sheet.

Clause 44. The tubular reactor of any one of clauses 19 to 43, further comprising a plurality of locking elements for selectively preventing rotation of the retaining devices.

Clause 45. The tubular reactor of clause 44, wherein each locking element comprises a locking body that can be engaged against one or more retaining devices to block rotation of said retaining devices.

Clause 46. The tubular reactor of any one of clauses 19 to 45, wherein each bore is configured to receive in use the catalyst in the form of a plurality of catalyst carriers that contain the catalyst and are insertable into the bore;
wherein in its first position each retaining device at least partially obstructs the outlet of one, some or all of its one or more associated reactor tubes so as to retain the plurality of catalyst carriers within the bore of one, some or all of its one or more associated reactor tubes; and
in its second position the outlet of at least one of its one or more associated reactor tubes is unobstructed sufficiently for permitting discharge of the plurality of catalyst carriers out of said outlet.

Clause 47. The tubular reactor of clause 46, wherein in its first position each retaining device is configured to support an endmost one of the plurality of catalyst carriers.

Clause 48. The tubular reactor of clause 47, wherein in its first position each retaining device:
directly supports the endmost one of the plurality of catalyst carriers by contacting the endmost one of the plurality of catalyst carriers; or
indirectly supports the endmost one of the plurality of catalyst carriers by contacting a supporting device that itself supports the endmost one of the plurality of catalyst carriers.

Clause 49. The tubular reactor of any one of clauses 19 to 45, wherein each bore is configured to receive in use the catalyst in the form of catalyst particles that are filled into the bore;
wherein in its first position each retaining device at least partially obstructs the outlet of one, some or all of its one or more associated reactor tubes so as to retain the catalyst particles within the bore of one, some or all of its one or more associated reactor tubes; and
in its second position the outlet of at least one of its one or more associated reactor tubes is unobstructed sufficiently so as to permit discharge of the catalyst particles out of said outlet.

Clause 50. The tubular reactor of clause 49, further comprising a plurality of supporting devices that support the catalyst particles within the bores;
wherein in its first position each retaining device at least partially obstructs the outlet of one, some or all of its one or more associated reactor tubes so as to retain a supporting device and hence the catalyst particles within the bore of one, some or all of its one or more associated reactor tubes; and
in the second position the outlet of one, some or all of its one or more associated reactor tubes are unobstructed sufficiently so as to permit discharge of the supporting device and thereafter the catalyst particles out of said outlet or outlets.

Clause 51. A method of loading and unloading catalyst into and out of a reactor tube of a tubular rector, the reactor tube comprising an elongate tube defining a bore for receiving a catalyst and having an outlet at one end of the bore for discharging the catalyst out of the bore, the method of loading comprising:
associating with the outlet of the reactor tube a retaining device;
rotating the retaining device into a first position in which it at least partially obstructs the outlet;
loading the catalyst into the reactor tube such that it is retained and supported by the retaining device;
the method of unloading comprising:
rotating the retaining device into a second position in which the outlet is sufficiently unobstructed; and
discharging the catalyst out of the outlet.

Clause 52. The method of clause 51, wherein two or more retaining devices are associated with the outlet of the reactor tube; and the method of loading comprises:
rotating each of the two or more retaining devices into their first position in which they at least partially obstruct the outlet;
loading the catalyst into the reactor tube such that it is retained and supported by the retaining devices;
the method of unloading comprising:
rotating each of the two or more retaining devices into their second position in which the outlet is sufficiently unobstructed; and
discharging the catalyst out of the outlet.

Clause 53. The method of clause 51 or clause 52, wherein the tubular reactor comprises a plurality of reactor tubes and a plurality of retaining devices; and the method of loading comprises:
rotating each retaining device into its first position in which it at least partially obstructs the outlet of at least one reactor tube;
loading the catalyst into the reactor tubes such that they are retained and supported by the retaining devices;
the method of unloading comprising:
rotating one or more of the retaining devices into its second position such that the outlet of at least one of the reactor tubes is sufficiently unobstructed; and
discharging the catalyst out of said outlet or outlets.

Clause 54. The method of clause 53, wherein the reactor tubes are unloaded one at a time by selectively rotating the retaining devices to sufficiently unobstruct the outlet of only one reactor tube at a time.

Clause 55. The method of clause 53, wherein the reactor tubes are unloaded two or more at a time by selectively rotating the retaining devices to sufficiently unobstruct the outlets of two or more reactor tubes at the same time.

Clause 56. The method of any one of clauses 51 to 55, wherein the catalyst is loaded into each bore by providing the catalyst in a plurality of catalyst carriers and loading the plurality of catalyst carriers into each bore.

Clause 57. The method of any one of clauses 51 to 55, wherein the catalyst is loaded into each bore by filling loose catalyst particulate into each bore.

The invention claimed is:

1. A reactor tube for a tubular reactor and a retaining device associated with the reactor tube;
    the reactor tube in the form of an elongate tube defining a bore for receiving in use a catalyst and having an outlet at one end of the bore for discharging the catalyst out of the bore;
    the retaining device being configured to be rotatable between a first position and a second position and rotatable about an axis that is parallel to, and non-coincident with, a longitudinal axis of the elongate tube;
    wherein in the first position the retaining device at least partially obstructs the outlet for retaining the catalyst within the bore; and
    in the second position the outlet is unobstructed sufficiently for permitting discharge of the catalyst out of the outlet.

2. The reactor tube and retaining device of claim 1, wherein the retaining device comprises a rotatable body that is rotatable between the first position and the second position.

3. The reactor tube and retaining device of claim 2, wherein the rotatable body comprises a rotatable disc.

4. The reactor tube and retaining device of claim 3, wherein the rotatable disc comprises a disc body and at least one aperture;
    wherein in the first position the disc body is configured to at least partially obstruct the outlet for retaining the catalyst within the bore and in the second position the at least one aperture is configured to align with the outlet;
    and optionally wherein the or each aperture of the rotatable disc is lens- shaped and the disc body is lune-shaped.

5. The reactor tube and retaining device of claim 2, wherein the rotatable body comprises an arm or lobe;
    wherein in the first position the arm or lobe is configured to at least partially obstruct the outlet for retaining the catalyst within the bore and in the second position the arm or lobe is configured to be non-aligned with the outlet.

6. The reactor tube and retaining device of claim 1, wherein the bore is configured to receive in use the catalyst in the form of a plurality of catalyst carriers that contain the catalyst and are insertable into the bore;
    wherein in the first position the retaining device at least partially obstructs the outlet so as to retain the plurality of catalyst carriers within the bore; and
    in the second position the outlet is unobstructed sufficiently so as to permit discharge of the plurality of catalyst carriers out of the outlet.

7. A tubular reactor comprising a plurality of reactor tubes and a plurality of retaining devices;
    each reactor tube comprising an elongate tube defining a bore for receiving in use a catalyst and having an outlet at one end of the bore for discharging the catalyst out of the bore;
    each retaining device being associated with one or more reactor tubes and being configured to be rotatable between a first position and a second position and each retaining device is rotatable about an axis that is parallel to, and non-coincident with, the longitudinal axes of the elongate tubes;
    wherein in its first position each retaining device at least partially obstructs the outlet of one, some or all of its one or more associated reactor tubes for retaining the catalyst within the bore of one, some or all of its one or more associated reactor tubes; and
    in its second position the outlet of at least one of its one or more associated reactor tubes is unobstructed sufficiently for permitting discharge of the catalyst out of said outlet.

8. The tubular reactor of claim 7, wherein each reactor tube has two, three or four retaining devices associated with its outlet.

9. The tubular reactor of claim 7, wherein the plurality of retaining devices are each rotatable independently of each other; or
    wherein two or more of the plurality of retaining devices are interlinked to be rotatable synchronously.

10. The tubular reactor of claim 7, wherein each retaining device is aligned at an interstice between two, optionally between three or four reactor tubes.

11. The tubular reactor of claim 7, further comprising a tube sheet supporting the plurality of reactor tubes;
    wherein the plurality of retaining devices are mounted to the tube sheet.

12. The tubular reactor of claim 7, further comprising a plurality of locking elements for selectively preventing rotation of the retaining devices;
    and optionally wherein each locking element comprises a locking body that can be engaged against one or more retaining devices to block rotation of said retaining devices.

13. A method of loading and unloading catalyst into and out of a reactor tube of a tubular rector of claim 7, the method of loading comprising:
    associating with the outlet of the reactor tube a retaining device;
    rotating the retaining device into a first position in which it at least partially obstructs the outlet;
    loading the catalyst into the reactor tube such that it is retained and supported by the retaining device;
    the method of unloading comprising:
    rotating the retaining device into a second position in which the outlet is sufficiently unobstructed; and
    discharging the catalyst out of the outlet.

14. The method of claim 13, wherein two or more retaining devices are associated with the outlet of the reactor tube; and the method of loading comprises:
    rotating each of the two or more retaining devices into their first position in which they at least partially obstruct the outlet;
    loading the catalyst into the reactor tube such that it is retained and supported by the retaining devices;
    the method of unloading comprising:
    rotating each of the two or more retaining devices into their second position in which the outlet is sufficiently unobstructed; and
    discharging the catalyst out of the outlet.

15. The method of claim 13, wherein the tubular reactor comprises a plurality of reactor tubes and a plurality of retaining devices; and the method of loading comprises:
- rotating each retaining device into its first position in which it at least partially obstructs the outlet of at least one reactor tube;
- loading the catalyst into the reactor tubes such that they are retained and supported by the retaining devices;

the method of unloading comprising:
- rotating one or more of the retaining devices into its second position such that the outlet of at least one of the reactor tubes is sufficiently unobstructed; and
- discharging the catalyst out of said outlet or outlets.

16. The method of claim 15, wherein the reactor tubes are unloaded one at a time by selectively rotating the retaining devices to sufficiently unobstruct the outlet of only one reactor tube at a time; or
- wherein the reactor tubes are unloaded two or more at a time by selectively rotating the retaining devices to sufficiently unobstruct the outlets of two or more reactor tubes at the same time.

17. The method of claim 13, wherein the catalyst is loaded into each bore by providing the catalyst in a plurality of catalyst carriers and loading the plurality of catalyst carriers into each bore.

18. The method of claim 13, wherein the catalyst is loaded into each bore by filling loose catalyst particulate into each bore.

* * * * *